United States Patent
Ota

(10) Patent No.: US 8,730,596 B2
(45) Date of Patent: May 20, 2014

(54) IMAGING DEVICE AND LENS BARREL

(71) Applicant: Nikon Corporation, Tokyo (JP)

(72) Inventor: Hidefumi Ota, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/846,350

(22) Filed: Mar. 18, 2013

(65) Prior Publication Data

US 2013/0209083 A1 Aug. 15, 2013

Related U.S. Application Data

(63) Continuation of application No. 13/176,287, filed on Jul. 5, 2011, now abandoned.

(30) Foreign Application Priority Data

Jul. 5, 2010 (JP) .................................. 2010-152908

(51) Int. Cl.
*G02B 7/02* (2006.01)

(52) U.S. Cl.
USPC ............................ 359/817; 359/818; 359/822

(58) Field of Classification Search
USPC .................................. 359/694–704, 811–830
See application file for complete search history.

(56) References Cited

U.S. PATENT DOCUMENTS

| 4,717,932 A | 1/1988 | Hoshino et al. |
| 5,347,333 A | 9/1994 | Takahashi |
| 2001/0007472 A1 | 7/2001 | Nishimura |
| 2002/0146246 A1* | 10/2002 | Miyazaki ......................... 396/79 |
| 2003/0063322 A1* | 4/2003 | Itoh et al. ...................... 358/302 |
| 2003/0095798 A1 | 5/2003 | Sakamoto |
| 2011/0181748 A1* | 7/2011 | Ohnishi ..................... 348/222.1 |

FOREIGN PATENT DOCUMENTS

| JP | 61-259240 | 11/1986 |
| JP | 3-237445 | 10/1991 |
| JP | 04-006931 | 1/1992 |
| JP | 5-288976 | 11/1993 |
| JP | 08-043710 | 2/1996 |

(Continued)

OTHER PUBLICATIONS

Japanese Office Action mailed May 8, 2012 issued in corresponding Japanese Patent Application No. 2010-152908.

(Continued)

*Primary Examiner* — Mohammed Hasan

(57) ABSTRACT

An imaging device comprises a lens barrel having an optical system with an adjustable focal point, and has a first state can focus relative to an imaging face, and a second state can not focus relative to the imaging face, a changing unit for changing the lens barrel from the second state to the first state when the imaging unit is activated, a discriminating unit which discriminates whether the state of the barrel is the first state or the second state, and a control unit which, at a time of activating the imaging unit, changes the lens barrel to the first state by the changing unit if it is discriminated that the state of the barrel is the second state, and which maintains the first state if it is discriminated that the state of the barrel is the first state.

9 Claims, 7 Drawing Sheets

(56) References Cited

FOREIGN PATENT DOCUMENTS

| | | |
|---|---|---|
| JP | 2001-194574 | 7/2001 |
| JP | 2003-140216 | 5/2003 |
| JP | 2003-149530 | 5/2003 |
| JP | 2003-161995 | 6/2003 |
| JP | 2005-31314 | 2/2005 |
| JP | 2006-243239 | 9/2006 |
| JP | 2008-193228 | 8/2008 |
| JP | 2010-103599 | 5/2010 |

OTHER PUBLICATIONS

Office Action mailed from the Unites Stated Patent and Trademark Office on Sep. 17, 2012 in the related U.S. Appl. No. 13/176,287.

U.S. Appl. No. 13/176,287, filed Jul. 5, 2011, Hidefumi Ota.

Notice of Allowance issued by the Japanese Patent Office on Oct. 1, 2013 in the corresponding Japanese patent application No. 2010-152908.

Office Action issued by the Japanese Patent Office on Jan. 28, 2014 in the corresponding Japanese patent application No. 2013-101384.

* cited by examiner

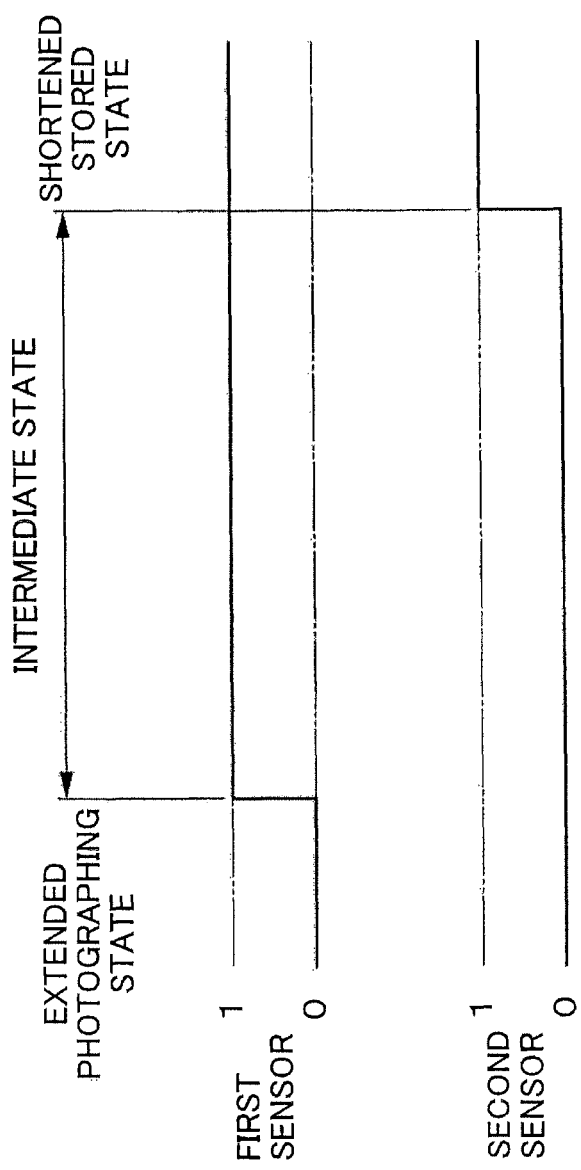

IMAGING DEVICE AND LENS BARREL

CROSS-REFERENCE TO RELATED APPLICATIONS

This application is a U.S. continuation application filed under 37 C.F.R. 1.53(b) claiming priority benefit of U.S. application Ser. No. 13/176,287, filed Jul. 5, 2011, pending, which claims foreign priority benefit on Japanese Patent Application No. 2010-152908, filed Jul. 5, 2010, the entire contents of which are incorporated herein by reference.

BACKGROUND

1. Field

The present invention relates to an imaging device and a lens barrel.

2. Description of the Related Art

In an imaging device of an interchangeable lens camera or the like, for example, in order to improve portability when the switch of the camera is set to off, there are cameras where the length of a mounted lens barrel is shortened as much as possible (for example, refer to Japanese Unexamined Patent Publication No. H8-43710). When the switch of such a camera is set to on, the lens extends from its shortest state to the photographing setup state.

SUMMARY

However, because the camera is an interchangeable lens camera, a lens barrel which is not in its shortest state may be mounted on the camera. In this case, when the camera switch is set to on, the lens momentarily contracts and then extends to the photographing state, and this requires time for the startup.

The objective of the present invention is to provide an imaging device and a lens barrel with good startup properties.

The present invention solves the above problem by the following means.

In order to achieve the object mentioned above, according to a first aspect of the present invention, an imaging device is provided. the imaging device comprise an imaging unit having an imaging face which images an image from a luminous flux, a lens barrel having an optical system with an adjustable focal point, and wherein a state of the barrel is changeable between a first state wherein it is possible to focus with respect to the imaging face by focal point adjustment of the optical system, and a second state wherein it is not possible to focus the image with respect to the imaging face, a changing unit for changing the lens barrel from the second state to the first state when the imaging unit is activated, a discriminating unit which discriminates whether the state of the lens barrel is the first state or the second state, and a control unit which, at a time of activating the imaging unit, changes the lens barrel to the first state by the changing unit if it is discriminated that the state of the lens barrel is the second state, and which maintains the first state if it is discriminated that the state of the lens barrel is the first state.

The second state may be a state where a length of the lens barrel along an optical axis direction of the optical system is shorter than the first state.

The second state may be a state wherein at least one part of the optical system has been moved to the imaging unit side compared to the first state, and the discriminating unit comprises a first detecting unit which detects that at least one portion of the optical system is at a control basis position of the optical system in the first state, and a second detecting unit which detects that the lens barrel is in the second state.

The control unit may control the changing unit such that the optical system is detected to be at the control basis position by the first detecting unit if it is discriminated that the state of the lens barrel when the imaging unit is activated is the second state.

The control unit may control the changing unit so that detection of the control basis position by the first detecting unit does not occur if it is discriminated that the state of the lens barrel when the imaging unit is activated is the first state.

The imaging device may be further provided with a setting unit which can set whether or not the lens barrel is changed from the first state to the second state by the changing unit when the activation of the imaging unit is cancelled.

The lens barrel may be separable from the imaging device, and may further comprise a second changing unit which changes the lens barrel to the second state when separated from the imaging device, if it is set by the setting unit to not change to the second state.

The lens barrel may be mountable and dismountable from the imaging device, and the control unit may stop the changing of the state of the lens barrel by the changing unit until the lens barrel is completely mounted on the imaging device.

The imaging device may further comprise a first mode where imaging by the imaging unit is possible, and a second mode where imaging by the imaging unit is not possible, and the control unit may stop the changing of the state of the lens barrel by the changing unit when in the second mode.

In order to achieve the object mentioned above, according to a second aspect of the present invention, a lens barrel is provided. The lens barrel comprise an optical system with an adjustable focal point, a moving member which, by moving at least one part of the optical system, can change a state of the barrel between a first state where it is possible to focus with respect to an imaging face by focal point adjustment of the optical system, and a second state where is it not possible to focus an image with respect to the imaging face, and a discriminating unit which discriminates whether the state of the lens barrel is the first state or the second state.

According to the present invention, it is possible to provide an imaging device and a lens barrel having good startup properties.

BRIEF DESCRIPTION OF THE DRAWINGS

FIG. 4 is a chart drawing of the output signal of the lens state discrimination mechanism;

FIG. 6 is a control flowchart for when the power switch is operated from OFF to ON.

DESCRIPTION OF EMBODIMENTS

Below, an embodiment of the present invention will be explained with reference to the drawings and the like. Moreover, in each of the drawings mentioned below, for ease of explanation and understanding, a suitable XYZ Cartesian coordinate system is provided. In this coordinate system, the position of the camera when the photographer photographs an image in the landscape orientation making the optical axis OA horizontal, is referred to as the correct position. In this correct position, the direction going towards the left as seen from the photographer is the X plus direction, the direction going upwards is the Y plus direction, the direction going towards the photographic subject is the Z plus direction, and the direction going towards the image is the Z minus direction.

Figure 1A:
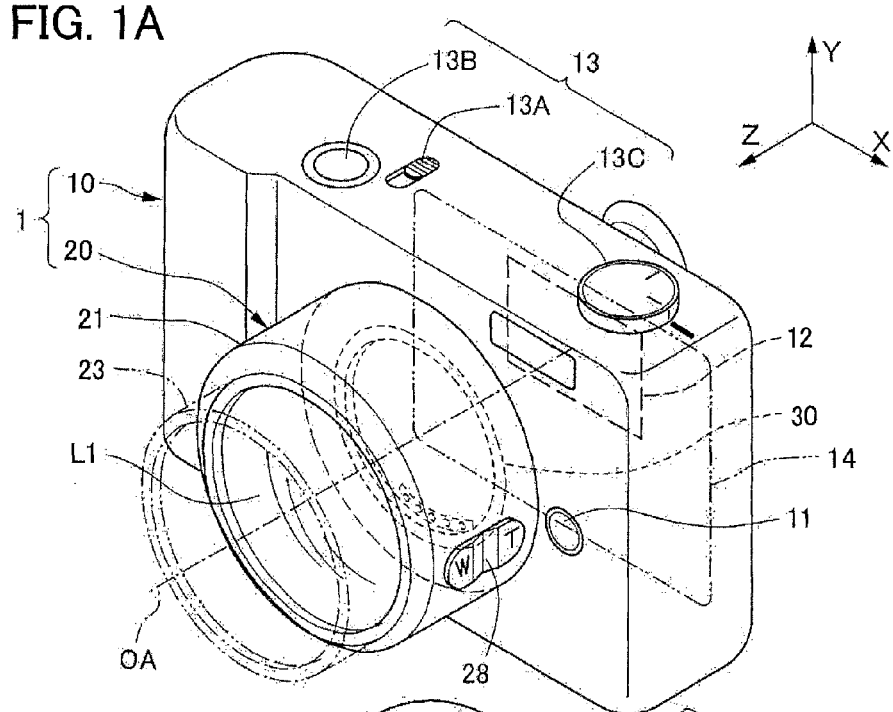
FIG. 1A is a perspective view conceptually showing a camera as a first embodiment of a camera system according to the present invention showing a state wherein the lens barrel is mounted on the camera.
Figure 1B:
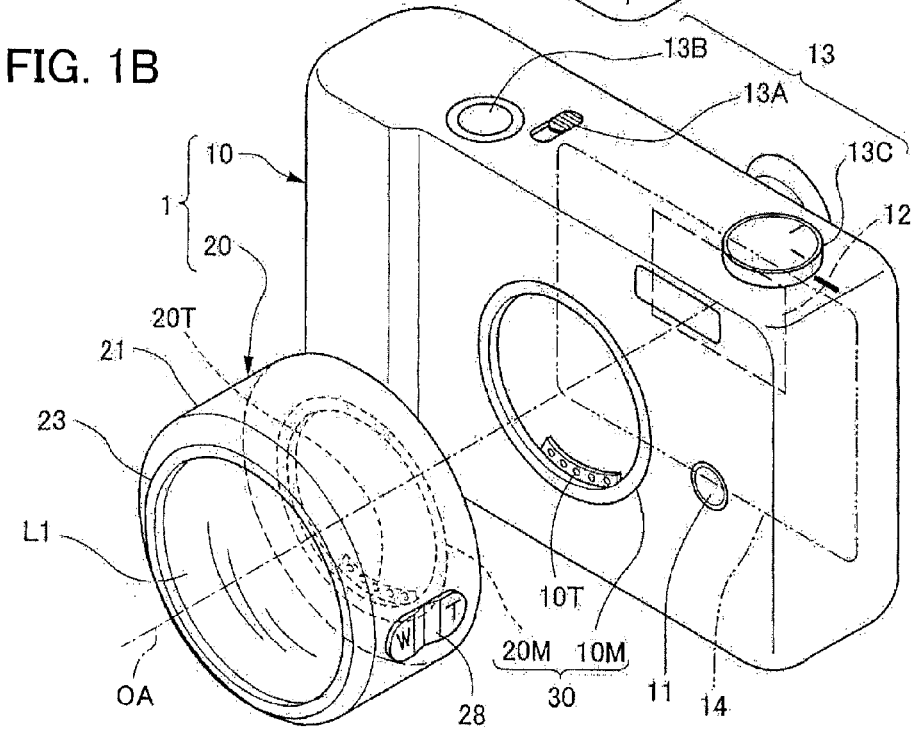
FIG. 1B is a perspective view conceptually showing a state wherein the lens barrel is detached from the camera.
Figure 2:
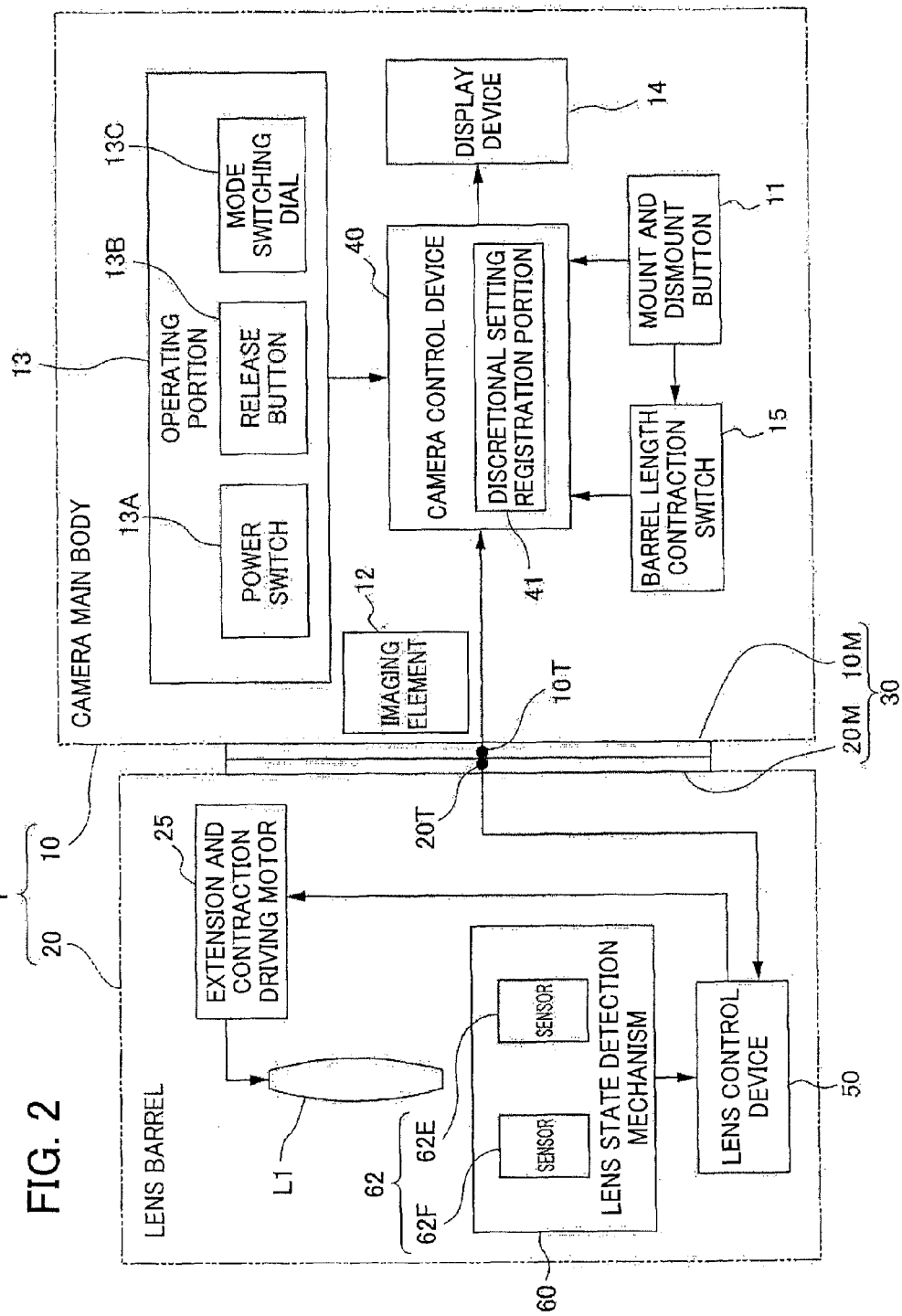
FIG. 2 is a functional block drawing of the camera.
Figure 3A:
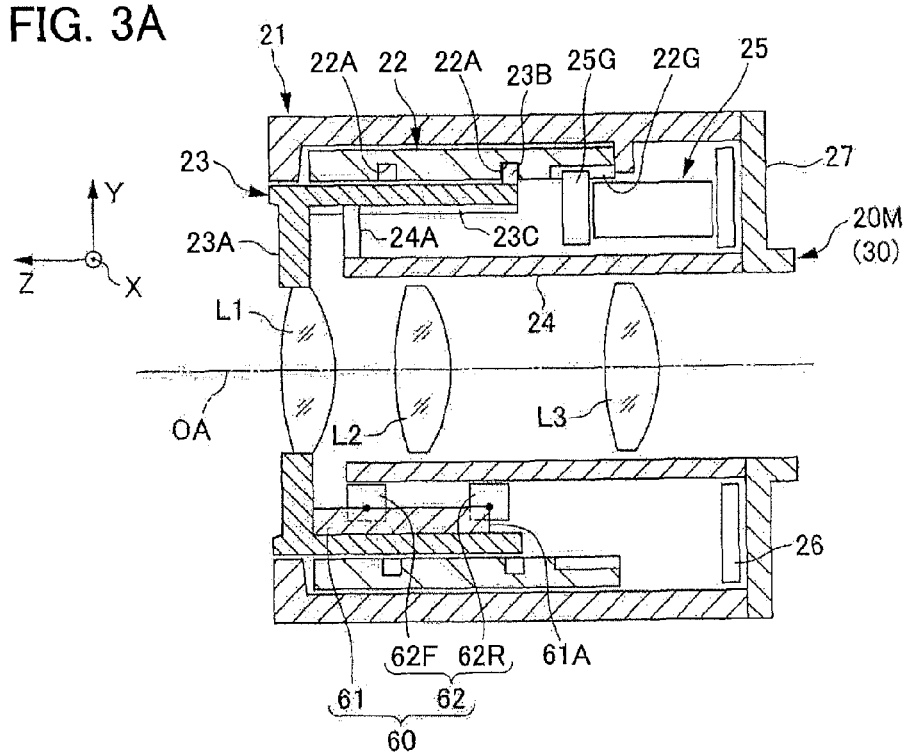
FIG. 3A is a cross sectional drawing of the lens barrel showing the shortened stored state.
Figure 3B:
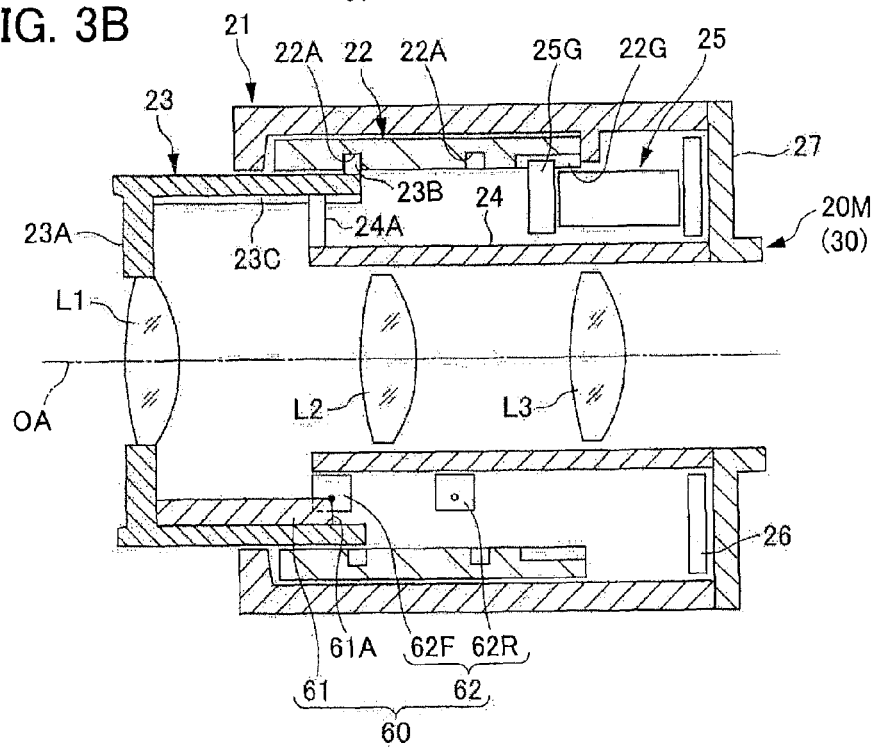
FIG. 3B is a cross sectional drawing of the lens barrel; showing the photographing standby state.

FIG. 1 is a perspective drawing conceptually showing one embodiment of a camera system 1 according to the present invention, and FIG. 1A shows a state wherein the lens barrel 20 is mounted on the camera 10, and FIG. 1B shows a state wherein the lens barrel 20 is detached from the camera 10. FIG. 2 is a functional block drawing of the camera system 1 of the present invention. FIG. 3 is a cross sectional drawing showing an outline of the constitution of the lens barrel 20, and FIG. 3A is the shortened stored state, and FIG. 3B is the extended photographing state. FIG. 4 is chart drawing of the output signals of the lens state discrimination mechanism 60 provided in the lens barrel 20.

The camera system 1 is constituted of the interchangeable lens digital camera 10, and a lens barrel 20 mountably and dismountably from the camera 10.

The camera 10 and the lens barrel 20, from the separated state shown in FIG. 1B, are aligned along the optical axis OA, and are joined so as to be mountable and dismountable by the mount mechanism 30 as shown in FIG. 1A. In this way, the camera system 1 is capable of photographing with various lens barrels 20 having differing focal lengths, functions and the like mounted on the camera 10 according to the photographic subject.

Further, the lens barrel 20 mounted on the camera 10 can adopt two states, i.e. a state which is compact and convenient for carrying (below this state is referred to as the shortened stored state) wherein a first lens unit L1 is contracted into the fixed barrel 21 as shown by solid lines in FIG. 1A; and a state where photography is possible (below referred to as the extended photographing state) where the first lens unit L1 is extended and projected outwards as shown by the double dotted line in FIG. 1A. In the following explanation, a movement from the shortened stored state to the extended photographing state is called the extension movement, a movement from the extended photographing state to the shortened stored state is called the contraction movement, and both combined are called the extension and contraction movement.

The mount mechanism 30 is an already known bayonet mount, and is constituted of a body mount 10M provided at the camera 10, and the lens mount 20M provided at the lens barrel 20.

The body mount 10M is provided with a body side contact 10T, and the lens mount 20M is provided with a lens side contact 20T. The body side contact 10T and the lens side contact 20T are in conductive contact in a state wherein the body mount 10M and the lens mount 20M are joined, such that information exchange between the camera 10 and the lens barrel 20, and power supply from the camera 10 to the lens barrel 20 are carried out. Further, by this conduction between the body side contact 10T and the lens side contact 20T, the later explained camera control device 40 (not shown in FIG. 1; refer to FIG. 2) can recognize when the lens barrel 20 is mounted.

Below, each portion of the camera 10 is explained in order.

The camera 10 is provided at its front face with the body mount 10M and a detach button 11. Further, the camera 10 is internally provided with an imaging element 12 and a camera control device 40 which generally controls the whole camera 1 (not shown in FIG. 1; refer to FIG. 2). Furthermore, the camera 10 is provided at its outer face with various operating members which constitute the operating portion 13 (refer to FIG. 2) and is provided at its rear face with a display device 14.

The body mount 10M, as mentioned above, is a constituent element of the camera 10 side of the mount mechanism 30, and can be mountably and dismountably joined with the lens mount 20M provided at the lens barrel 20.

The detach button 11 is disposed so as to be operable by pressing from the front face side of the camera 10, and has the function of releasing the engagement between the body mount 10M and the lens mount 20M by the engaging mechanism, by a pressing operation. Further, the detach button 11 is linked with an electric barrel length contraction switch 15 (shown in FIG. 2), and pressure information of the detach button 11 (namely, operating information of the barrel length contraction switch 15) is input to the camera control device 40. Further, pressure (ON) information of the barrel length contraction switch 15 is used to command the contraction movement of the lens barrel 20.

The imaging element 12 is constituted of a CCD or the like which converts photographic subject light into an electric signal. The imaging element 12 is disposed inside the camera body 10 so that its light receiving face is at a right angle to the optical axis OA. The imaging element 12 is driven and controlled by the camera control device 40 and outputs electric image information converted from the subject light to the camera control device 40.

The operating portion 13 is provided with the power switch 13A, the shutter button 13B, and the mode selection dial 13C.

The power switch 13A is the main switch which starts the flow of current to the camera body 10. In the present embodiment shown in FIG. 1, it is disposed at the upper face of the camera 10.

The shutter button 13B is a switch which commands a photographing operation to the camera control device 40, and is disposed at the upper face of the camera 10.

The mode selection dial 13C is a switch which changes the display of the display device 14 explained later. For example, it switches between the display (live view mode) of an image (through image) being imaged by the imaging element 12 at that time, and the reproduction display (reproduction mode) of an image (photographed image) photographed and recorded in a storage device, not shown. The mode selection dial 13C is disposed at the upper face of the camera 10.

Further, the operating portion 13 may be provided with buttons or dials or the like, not shown, for carrying out various settings in addition to the above. Further, the operating manner and position of disposing each of the operating members of the operating portion 13 is not limited by the present embodiment, and may be set as appropriate.

The display device 14 is constituted of a liquid crystal panel or the like, and displays the through image imaged by the imaging element 12, a photographed image, and its histogram and photographic information, or the like. Further, it displays the setting information of the camera 1, the setting menu or the setting items or the like.

The camera control device 40, not shown, is constituted by providing a CPU, buffer memory, a storage device storing various control programs, and the like. Further, the camera control device 40 is provided with a setting registration portion 41 which stores the settings relating to the control of the camera 1 freely set by the user. The setting registration portion 41, for example, records as control information the setting (below referred to as the "barrel length contraction setting") of "do/do not" put the lens barrel 20 mounted on the camera 10 into the shortened stored state when the power switch 13A is set to OFF.

The camera control device 40 generally controls the whole camera 1 including the lens barrel 20 based on the operation command input via the operating portion 13 and the control program stored in the storage device. The extension and contraction control of the lens barrel 20 by this camera control device 40 is explained below.

The camera 10 constituted as described above is capable of photographing when the power switch 13A is activated in a state where a lens barrel 20 is mounted as shown in FIG. 1A and the lens barrel 20 is in the extended photographing state.

The camera 10 is controlled by the camera control device 40, and when the shutter button 13B is pressed and operated, the subject image imaged by the lens barrel 20 is converted by the imaging element 12 into an electric signal as image data, and this image data is signal processed as picture data and recorded in the recording device, not shown.

The display device 14 displays a photographed image and its histogram and image information, as well as setting information, and setting menus and setting items and the like of the camera 1 according to the operation of the operating portion 13, as described above. The display of a photographed image at the display device 14 is carried out by switching the mode selection dial 13C of the operating portion 13 to the reproduction mode, as described above.

Further, when the power switch 13A of the camera 10 is in the ON state, when no operation of the operating portion 13 is carried out for a predetermined time, the camera control device 40 carries out a sleep control to stop the supply of power with the camera in its present state, and puts the camera into a sleep state.

Next, the lens barrel 20 is explained.

The lens barrel 20 is provided with three sets of lens units (the first lens unit L1, the second lens unit L2, and the third lens unit L3), and is a zoom lens which is capable of changing its focal length (zooming). Further, the lens barrel 20, as described above, is capable of adopting two states, a state (the shortened stored state) where the extending and contracting tube 23 (first lens unit L1) is stored inside the exterior tube 21 shown in FIG. 3A, and a state (the extended photographing state) where the extending and contracting tube 23 which holds the first lens unit L1 protrudes from the front face side of the exterior tube 21 shown in FIG. 3B. In the shortened stored state, the front face of the extending and contracting tube 23 approximately coincides with the front face of the exterior tube 21. In the shortened stored state, it is not possible to photograph, and zooming is carried out in the extended photographing state.

Below, each portion of the lens barrel 20 is explained in order.

The lens barrel 20 is concentrically provided with the rotating tube 22, the extending and contracting tube 23 which holds the first lens unit L1, and the fixed inner tube 24 inside the exterior tube 21. Further, the lens barrel 20 is provided with the extension and contraction driving motor 25 and the lens control device 50 (not shown in FIG. 3, shown in FIG. 2) which constitute the control board 26, and the lens state discrimination mechanism 60 and the like.

The exterior tube 21 is cylindrically shaped, and forms the exterior of the lens barrel 20. The base end portion (end portion at the image side) of the exterior tube 21 is fixed to the rear face plate 27 constituting the lens mount 20M.

The rotating tube 22 is fit at the inner circumference of the exterior tube 21 so as to be freely rotatable, but immovable in the optical axis OA direction. A helical cam groove 22A is formed at the inner circumferential face of the rotating tube 22. A later described cam follower 23B of the extending and contracting tube 23 is fit so as to be slidably moveable at this cam groove 22A.

Further, at the inner circumferential portion of the image side end portion of the rotating tube 22, the inner circumferential gear 22G is formed. This inner circumferential gear 22G engages with the driving gear 25G of the later described extension and contraction driving motor 25.

The extending and contracting tube 23 is formed with a cylindrical shape at its outer diameter which is slidably fit at the inner circumferential face of the rotating tube 22, and the extending and contracting tube 23 holds the first lens unit L1 via the cylindrically shaped retaining portion 23A at its front face side inner circumference.

The cam follower 23B is provided to protrude at the outer circumferential face of the extending and contracting tube 23, and this cam follower 23B is slidably fit with the cam grove 22A of the rotating tube 22.

Further, the direct advance groove 23C is formed parallel to the optical axis OA at the inner circumference of the extending and contracting tube 23. The later described direct advance guide projection 24A of the fixed inner tube 24 is slidably fit at this direct advance groove 23C.

Furthermore, the projecting portion 61 constituting the lens state discrimination mechanism 60 is formed at the inner circumference of the extending and contracting tube 23. The projecting portion 61 is a plate of a predetermined thickness, and extends towards the image side parallel to the optical axis OA direction from the retaining portion 23A. The edge of the image side of the projecting portion 61 is the later described detection subject portion 61A. The location of disposing this projecting portion 61 corresponds to the sensors 62 provided at the later described fixed inner tube 24 (first sensor 62F, second sensor 62R).

The fixed inner tube 24 is fixed by its base end portion to the rear face plate 27. The end portion of the front face side of the fixed inner tube 24 is drawn further in towards the image side than the front end face of the exterior tube 21.

Further, the direct advance guide projection 24A is provided to protrude at the outer circumference side of the front end portion of the fixed inner tube 24. The direct advance guide projection 24A is slidably fit with the direct advance groove 23C of the extending and contracting tube 23.

Furthermore, the fixed inner tube 24 is provided with a pair (2 units) of sensors 62 (a first sensor 62F and a second sensor 62R) constituting the lens state discrimination mechanism 60 along with the projecting portion 61 formed at the extending and contracting tube 23. The first sensor 62F is provided at the front end portion of the fixed inner tube 24, and the second sensor 62R is provided separated by a predetermined interval in the optical axis OA direction at the sensor side from the first sensor 62F.

The sensors 62 are photointerruptors formed of a light emitting portion and a light receiving portion disposed facing each other, and are disposed so as to detect the later described projecting portion 61 of the extending and contracting tube 23. Namely, the output of the sensors 62 is OFF in a state where there is no occlusion in the detection region and the output is ON when the projecting portion 61 crosses the detection region.

The lens state discrimination mechanism 60, as described below, is constituted by the sensors 62 (first sensor 62F, second sensor 62R) provided at the fixed inner tube 24, and the projecting portion 61 formed at the extending and contracting tube 23.

Here, the projecting portion 61 and the sensors 62 (first sensor 62F, second sensor 62R) are constituted with the below described positional relationship.

In the shortened stored state shown in FIG. 3A, the projecting portion 61 is positioned in the detection region of the first sensor 62F, and further, the detection subject portion 61A is positioned just in the detection region of the second sensor 62R. This is the position where the output signal from the first sensor 62F is ON, and in the case that the extending and contracting tube 23 (first lens unit L1) has been moved from the extended photographing state towards the image side by a storing movement, the output signal of the second sensor 62R switches from OFF to ON. Below, this signal state of the shortened stored state is called [1,1].

On the other hand, in an extension movement of the extending and contracting tube 23 (first lens unit L1) from the shortened stored state, the projecting portion 61 continues to be positioned in the detection region of the first sensor 62F, but the detection subject portion 61A is outside of the detection region of the second senor 62R. In this way, the output signal of the first sensor 62F is ON, and the output signal of the second sensor 62R is OFF. The signal state of this intermediate state is called [1,0].

In the extended photographing state shown in FIG. 3B, the projecting portion 61 is outside of the detection region of the second sensor 62R, and the detection subject portion 61A is positioned just in the detection region of the first sensor 62F. This is the position where, the output signal from the second sensor 62R is OFF, and in the case that the extending and contracting tube 23 (first lens unit L1) has been moved towards the front face side by the extension movement, the output signal of the first sensor 62F switches from ON to OFF. The signal state of this extended photographing state is called [0,0].

By a constitution such as the above lens state discrimination mechanism 60, it is possible to understand the extension and contraction state of the lens barrel 20. Namely, as shown in FIG. 4, if the output signals of the first sensor 62F and the second sensor 62R are both ON (signal [1,1]), it is the shortened stored state, and if the output signals of the first sensor 62F and the second sensor 62R are both OFF (signal [0,0]), it is the extended photographing state. Further, if the output signal of the first sensor 62F is ON and the output signal of the second sensor 62R is OFF (signal [1,0]), it can be understood that the state is an intermediate state between the shortened stored state and the extended photographing state.

The output signal of such a lens state discrimination mechanism 60 is input to the lens control device 50 as lens state detection information.

The second lens unit L2 and the third lens unit L3 are provided so as to be moveable in the optical axis OA direction at the inner side of the fixed inner tube 24. By moving the second lens unit L2 and the third lens unit L3 in the optical axis OA direction, the focal length of the lens barrel 20 changes (zooming). This zooming operation is carried out by a zoom drive mechanism, not shown, in response to an operation of the zoom switch 28 provided at the outer circumferential face of the exterior tube 21.

Further, the third lens unit L3 is a focusing lens and can be independently moved and driven in the optical axis OA direction and the focus adjustment is carried out by changing the focal point by moving this third lens unit L3 in the optical axis OA direction.

The extension and contraction driving motor 25 is disposed at the image side (rear face plate 27 side) between the exterior tube 21 and the fixed inner tube 24, with a rotation axis parallel to the optical axis OA. The driving gear 25G is fixed to the rotation axis of the extension and contraction driving motor 25, and the driving gear 25G engages with the inner circumferential gear 22G of the rotating tube 22. In this way, the extension and contraction driving motor 25 rotationally drives the rotating tube 22 by its rotation. This extension and contraction driving motor 25 is driven and controlled by the below described lens control device 50, and rotates in both the forward and reverse directions. Namely, this extension and contraction driving motor 25 rotationally drives the rotating tube 22 in both the forward and reverse directions.

The control board 26 is disposed to be positioned adjoining the rear face plate 27 between the exterior tube 21 and the fixed inner tube 24. The control board 26 constitutes the lens control device 50, and the CPU and the like are mounted thereon.

In the lens barrel 20 constituted as above, the extending and contracting tube 23, because its direct advance groove 23C is engaged with the direct advance guide projection 24A of the fixed inner tube 24, is not rotatable but is moveable in the extension direction (namely, the direction parallel to the optical axis OA) of the direct advance groove 23C. Further, the cam follower 23B of the extending and contracting tube 23 is slidably engaged with the cam groove 22A of the rotating tube 22. In this way, when the rotating tube 22 rotates, as the position in the optical axis OA direction of its cam groove 22A changes, the cam follower 23B of the extending and contracting tube 23 is movably operated in the optical axis direction OA. Namely, by the rotational driving of the rotating tube 22 by the extension and contraction driving motor 25, the extending and contracting tube 23 is moved in the optical axis OA direction. The extension and contraction driving motor 25, as described above, is controlled and driven by the lens control device 50. Namely, the lens control device 50 controls the extension and contraction movement of the extending and contracting tube 23.

The lens control device 50 is connected so as to be able to exchange information with the camera control device 40 of the camera 10 via the lens mount 20M (mount mechanism 30) when the lens barrel 20 is joined to the camera 10 by the mount mechanism 30. Then, the lens control device 50 understands the extension and contraction state of the lens barrel 20 based on the input information from the lens state discrimination mechanism 60, and sends this state information to the camera control device 40 of the camera 10, and further, drives and controls the extension and contraction driving motor 25 based on the commands sent from the camera control device 40.

In the camera system 1 constituted of the camera 10 and the lens barrel 20 as described above, the camera control device 40 of the camera 10 carries out extension and contraction control of the lens barrel 20 via the lens control device 50 based on the operation of the operating portion 13, the state information of the lens barrel 20 sent via the lens control device 50, and a predetermined program.

Next, the extension and contraction control of the lens barrel 20 by the camera control device 40 is explained with reference to the flow charts shown in FIGS. 5 to 7. In the following explanations and drawings, "step" is abbreviated as "S".

Figure 5:
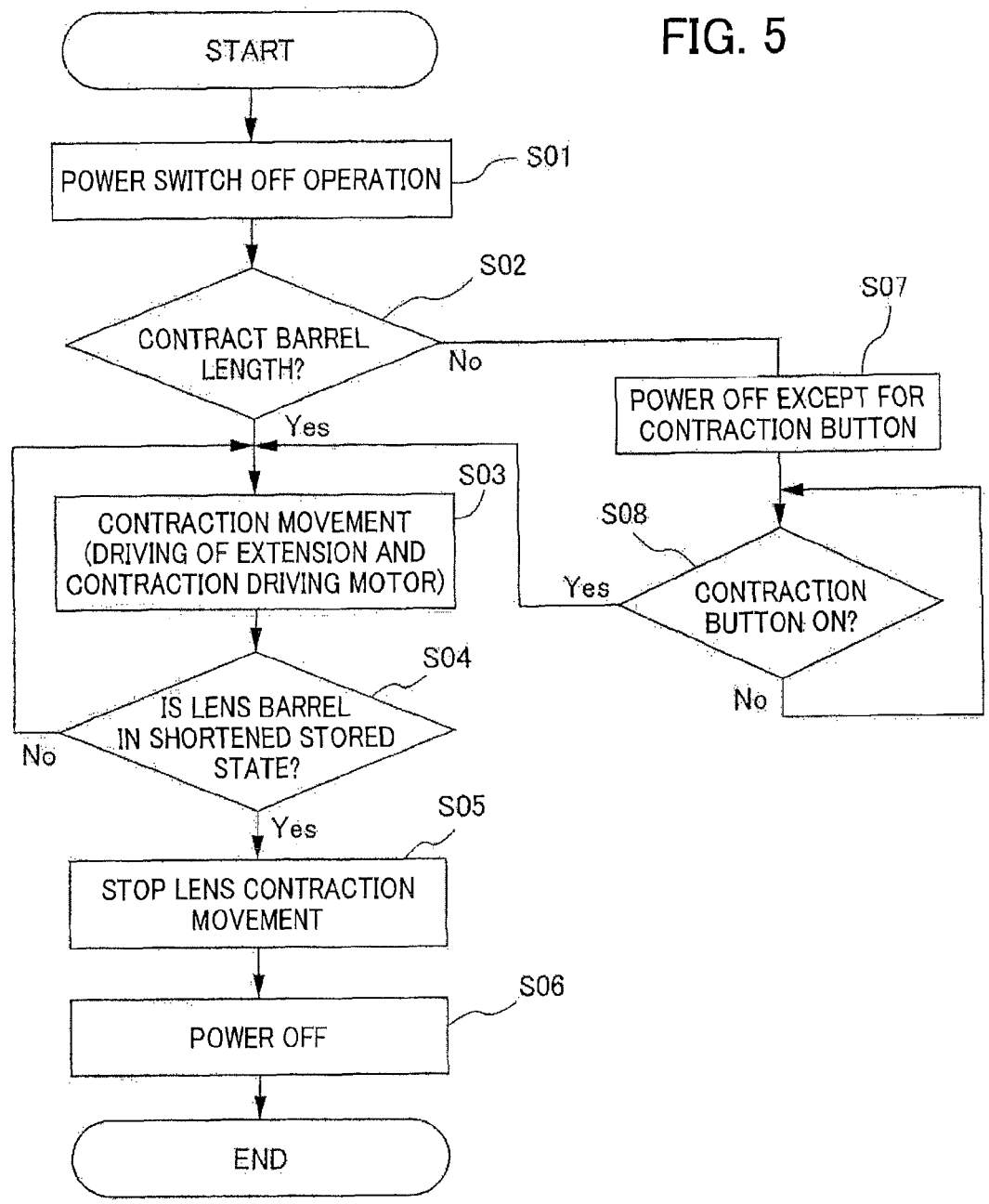
FIG. 5 is a control flowchart for when the power switch is operated to OFF after concluding photography.

First, the control when the power switch 13A is operated to OFF, after conclusion of the photography, shown in the flowchart of FIG. 5, is explained.

When the photography is concluded, the lens barrel 20 is in the extended photographing state. When the power switch 13A is set to OFF from this state, the camera control device 40 refers to the "barrel extension and contraction setting" of the setting registration portion 41, and controls and drives the lens barrel 20 (extension and contraction driving motor 25) in response to this "barrel extension and contraction setting".

Namely, when the power switch 13A is operated to OFF (S01), it is judged whether the "barrel extension and contraction setting" is set to "contract barrel length when power is OFF" (S02).

In step 02, if it is judged that the "barrel extension and contraction setting" is set to "contract barrel length when power is OFF" (Yes), then the extension and contraction driving motor 25 is driven towards the contraction movement side (S03), and the point in time when the lens barrel 20 reaches the shortened stored state is judged (S04).

The judgment that the lens barrel 20 has reached the shortened stored state in this step 04 is carried out at the point in time that the signal [1,1] of the lens state discrimination mechanism 60 has been detected by the lens control device 50.

In step 04, if it is judged that the lens barrel has reached the shortened stored state (Yes), the storing movement (driving of the extension and contraction driving motor 25) is stopped (S05). In this way, the lens barrel 20 reaches the shortened stored state, and the power is set to OFF (S06).

On the other hand, in step 02, if the "barrel extension and contraction setting" is set to "do not contract barrel length when power is OFF" (No), the power is set to OFF with only the barrel length contraction switch 15 being effective (S07), without driving the extension and contraction driving motor 25 (with the lens barrel as is, in the extended photographing state), and the ON operation of the barrel length contraction switch 15 is judged (namely, the pressing operation of the detach button 11) (S08).

Then, if it is judged in step 08 that the barrel length contraction switch 15 is operated to ON (Yes), each step of the storing movement after step 03 is executed, and the power is set to OFF as in the shortened stored state (S06).

According to the control when the power switch 13A is OFF as described above, is it possible to set the power to OFF with the lens barrel as is, in the extended photographing state, by setting the "barrel extension and contraction setting" of the setting registration portion 41 to "do not contract barrel length when power is OFF". In this way, the next time the power is set to ON, it is unnecessary to carry out the extension movement of the lens barrel 20 from the shortened stored state to the extended photographing state.

Namely, if the lens control device 50 detects a signal [0,0] of the lens state discrimination mechanism 60 the extended photographing state, it is possible to immediately carry out the control after the recognition of the extended photographing state, without carrying out the initial operation for understanding the position by moving the lens barrel 20 to a temporary predetermined state. Because of this, it is possible to photograph in a very short time by setting the power switch 13A to ON, and it is possible to avoid the problem that a shutter chance is missed due to the initialization operation.

Further, in the power OFF state with the lens barrel 20 in the extended photographing state, if the barrel length contraction switch 15 is pressed and operated, the contraction movement is carried out. Because of this, even if the "barrel extension and contraction setting" is set to "do not contract barrel length when power is OFF", it is possible to optionally put the lens barrel 20 in the shortened stored state after the power is OFF.

Figure 6:
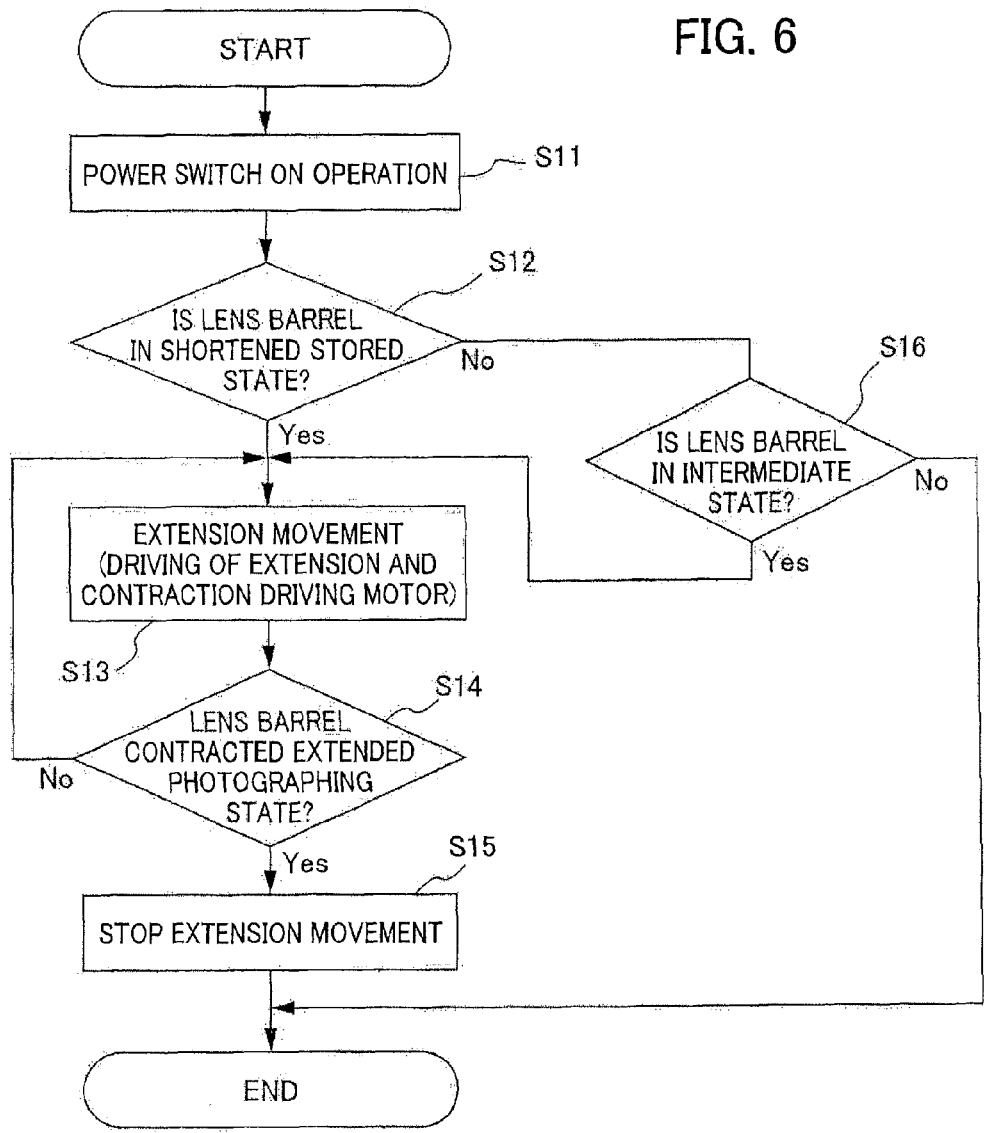

Next, the control when the power switch 13A is operated from OFF to ON is shown in the flowchart of FIG. 6 is explained.

When the power switch 13A is operated to ON (S11), it is judged whether the lens barrel 20 is in the shortened stored state (whether the lens control device 50 detects a signal [1,1] of the lens state discrimination mechanism 60) (S12).

In step 12, if it is judged that the lens barrel 20 is in the shortened stored state (Yes), the extension and contraction driving motor 25 is driven in an extension movement (S13), and the point in time when the lens barrel 20 reaches the extended photographing state is judged (S14).

The judgment that the lens barrel 20 has reached the extended photographing state is carried out at the point in time that the signal [0,0] of the lens state discrimination mechanism 60 has been detected by the lens control device 50.

In step 14, when it is judged that the lens barrel 20 has reached the extended photographing state (Yes), the extension movement (driving of the extension and contraction driving motor 25) is stopped (S15). In this way, the lens barrel 20 reaches the extended photographing state.

On the other hand, in step 12, if it is judged that the lens barrel 20 is not in the shortened stored state (No), it is next judged whether the lens barrel 20 is in an intermediate state (S16).

The judgment that the lens barrel 20 is in an intermediate state is carried out if the lens control device 50 detects that the signal of the lens state discrimination mechanism 60 is [1,0].

In step 16, if it is judged that the lens barrel 20 is in an intermediate state (Yes), the above described steps 13 to 15 are executed, and the lens barrel 20 reaches the extended photographing state.

In step 16, if it is judged that the lens barrel 20 is not in an intermediate state (No), the lens barrel is in the extended photographing state (namely, the state where the lens control device 50 detects the signal [0,0] from the lens state discrimination mechanism 60), or the lens barrel 20 is not mounted, and the control is concluded.

In the control described above, when the power switch 13A is turned ON, in whatever state the lens barrel 20 is at that time, it is put into the extended photographing state.

Namely, according to the control at the time that the power switch 13A is turned OFF shown in the flowchart in the above described FIG. 5, in the state that the power of the camera 1 (camera 10) is turned OFF, the lens barrel 20 has the two states of the shortened stored state and the extended photographing state, and in addition, it is possible that mounting or dismounting of the lens barrel 20 is carried out in a state of power OFF, and the lens barrel 20 is mounted in an intermediate state.

According to the control when the power switch 13A is ON in the present invention, in any of these states, the lens barrel 20 is put in the extended photographing state as the power switch 13A is turned ON.

Figure 7:
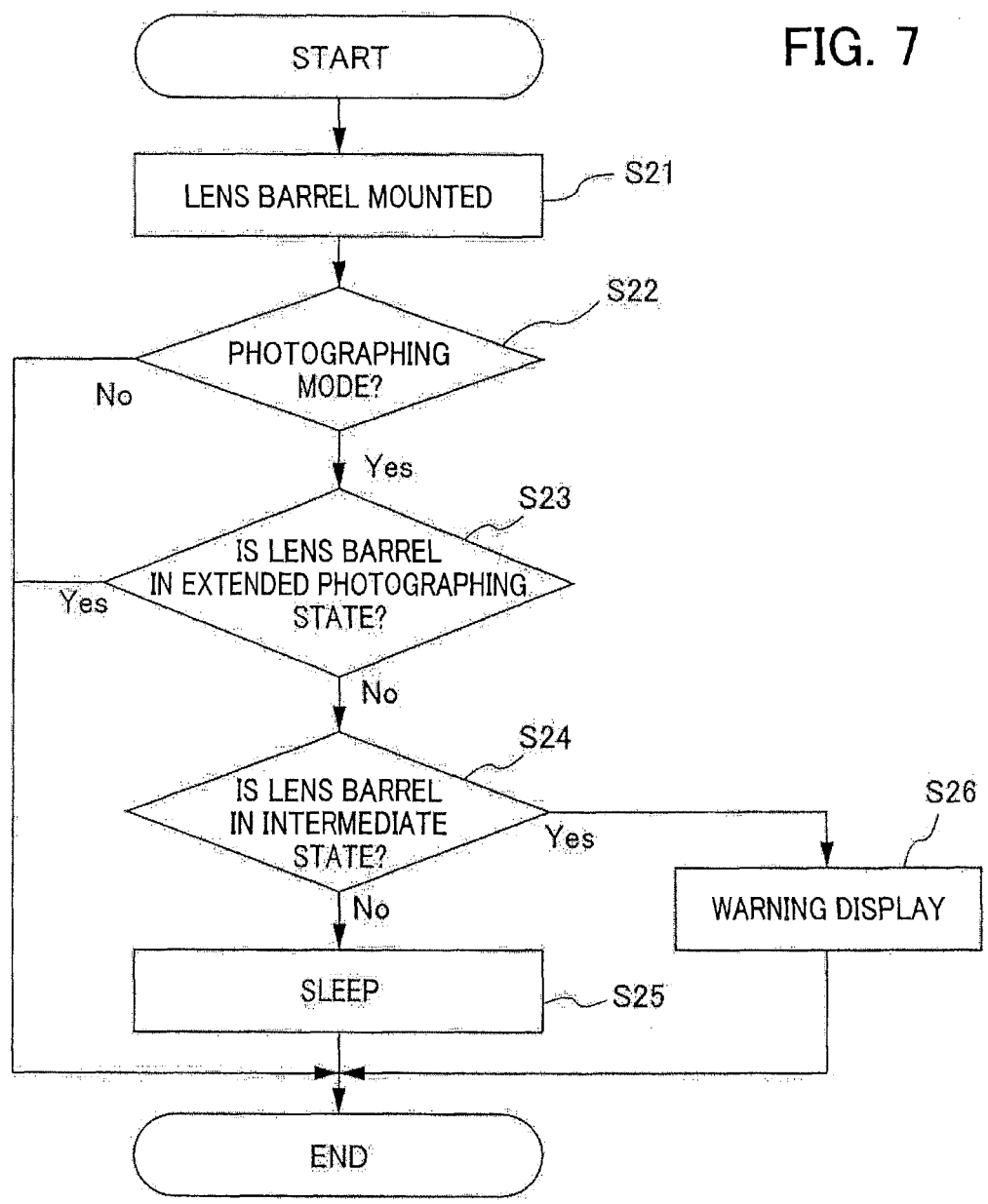
FIG. 7 is a control flowchart for when a lens barrel is mounted, after power of the camera main body has been turned ON in a state where the lens barrel had not yet been mounted.

Next, the control for the case that the lens barrel 20 is mounted, after the power of the camera 10 is turned ON in a state that the lens barrel 20 has not been mounted, shown in the flowchart of FIG. 7, is explained.

When the lens barrel 20 is mounted (S21) with the power of the camera 10 in the ON state, first, it is judged whether the state of the camera 10 is the photographing mode (S22).

In step 22, if it is judged that the state of the camera 10 is not the photographing mode (No), control is concluded as being in the reproduction mode.

On the other hand, in step 22, if it is judged that the state of the camera 10 is the photographing mode (Yes), next, it is judged whether the mounted lens barrel 20 is in the extended photographing state (S23).

In step 23, if it is judged that the lens barrel 20 is in the extended photographing state (Yes), the control is concluded as is.

In step 23, if it is judged that the lens barrel 20 is not in the extended photographing state (No), next, it is judged whether the lens barrel 20 is in an intermediate state (S24).

In step 24, if it is judged that the lens barrel 20 is not in an intermediate state (No), the camera 10 is put into a sleep state (S25) and the control is concluded.

In step 24, if it is judged that the lens barrel 20 is in an intermediate state (Yes), a warning display "lens barrel 20 is mounted in an intermediate state" is displayed at the display device 14 (S26) and the control is concluded.

In the above described control, in a camera 10 in the photographing mode with the power in the ON state, if a lens barrel 20 is mounted in the shortened stored state, the camera 10 is put in the sleep state. Further, if the lens barrel 20 is mounted in an intermediate state, a warning is displayed. In this way, it is possible to prevent problems due to extending the lens barrel 20 just as the lens barrel 20 is mounted on the camera 10.

With the camera 10 in the sleep state, the sleep state is cancelled by operating any of the operating members of the operating portion 13. When the sleep state is cancelled, control is carried out in the same way as when the power is ON shown in the flowchart of FIG. 6 described above, and the lens barrel 20 is put in the extended photographing state.

Further, in the case that a warning display is made when the lens barrel 20 is mounted on the camera 10 in an intermediate state, by turning the power switch 13A OFF once, and then turning it ON again, the above described control for when the power is ON shown in the flowchart in FIG. 6 is carried out, and the lens barrel 20 is put in the extended photographing state.

Further, when the camera 10 is in the reproduction mode, in the above control, the lens barrel 20 is not moved regardless of its state. In this case, by switching the mode selection dial 13C to the photographing mode, control is carried out in the same as when the power is ON as described above, and the lens is put in the extended photographing state.

According to the above described embodiment, the following effects are obtained.

(1) The lens barrel 20 of the above described camera 1 can adopt the different states of the shortened stored state and the extended photographing state. The lens barrel 20 is provided with a lens state discrimination mechanism 60, which is constituted with two sensors 62 (first sensor 62F and second sensor 62R), and a projecting portion 61 which is detected by these sensors 62, and which have different combinations of output signals from the sensors 62 when the lens barrel 20 is in the shortened stored state and in the extended photographing state. In this way, it is possible to recognize the state of the lens barrel 20 by the output signal of the lens state discrimination mechanism 60, and based on this subsequent control is possible.

(2) According to the control by the camera control device 40 when the power switch 13A is operated to OFF, it is possible to switch the power to OFF with the lens barrel 20 as is, in the extended photographing state, by setting the "barrel extension and contraction setting" of the setting registration portion 41 of the camera control device 40 to "do not contract barrel length when power is OFF". In this way, the next time the power is switched ON, it is possible to photograph immediately without carrying out the extension movement of the lens barrel 20, and it is possible to avoid the problem of missing a shutter chance because of the initialization operation.

(3) According to the control carried out by the camera control device 40 when the power switch 13A is operated to OFF, if the detach button 11 is pressed and operated in the state where the power is OFF with the lens barrel 20 in the extended photographing state, the contraction movement is carried out. Because of this, even if the "barrel extension and contraction setting" is set to "do not contract barrel length when power is OFF", it is possible to voluntarily set the lens barrel 20 to the shortened stored state after the power is OFF. Further, when the detach button 11 is pressed and operated in order to change the lens, a storing movement of the lens barrel 20 is carried out and it is put in the shortened stored state. In this way, lens barrels 20 in a single state separated from the camera 10 are uniformly put into the compact shortened stored state.

(4) According to the control by the camera control device 40 when the power switch 13A is operated to ON, when the power switch is switched to ON, it is possible to put the lens barrel 20 in the extended photographing state, regardless of which state, the shortened stored state, an intermediate state, or the like, it is in at that time.

(5) According to the control by the camera control device 40 in the case that a lens barrel 20 is mounted, after the power of the camera 10 has been switched to ON in a state where the lens barrel 20 has not yet been mounted, in the case that the lens barrel is mounted in the shortened stored state on the camera 10 in the photographing mode with the power in the ON state, the camera 10 is put in the sleep state. Further, in the case that the lens barrel 20 is mounted in an intermediate state, a warning display is carried out. In this way, it is possible to prevent problems with the lens barrel 20 extending just as the lens barrel 20 is being mounted on the camera 10.

(Modifications)

The above explained embodiments are not limitations, and many modifications and changes are possible such as those shown below, and these are also included in the scope of the present invention.

(1) In the present embodiment, it was explained that the extension and contraction control of the lens barrel 20 is carried out by the camera control device 40 provided at the camera 10, based on the lens state information input from the lens control device 50. However, it may also be constituted so as to be carried out by the camera control device 40 from understanding the lens state information, and further, it may also be constituted such that the extension and contraction control of the lens barrel 20 is carried out by the lens control device 50. Moreover, it may also be constituted such that the control is appropriately shared by the camera control device 40 and the lens control device 50.

(2) In the present embodiment, the sensors 62 (first sensor 62F and second sensor 62R) of the lens state judging means 60 are constituted of photo interruptors. However, the detection means is not limited to this, and may be any other means capable of detection.

(3) The present embodiment is constituted such that the detach button 11 and the barrel length contraction switch 15 are linked. However, the barrel length contraction switch 15 may also be independently provided.

Moreover, the embodiments and modifications may be used in appropriate combinations, but detailed explanations thereof are omitted. Further, the present invention is not limited by the above explained embodiments.

What is claimed is:

1. An imaging device comprising:
   an imaging unit having an imaging face which images an image from a luminous flux;
   a lens barrel having an optical system with an adjustable focal point, and wherein a state of the barrel is changeable between a first state wherein it is possible to focus with respect to the imaging face by focal point adjustment of the optical system, and a second state in which a length of the lens barrel along an optical axis of the optical system is shorter than in the first state wherein it is not possible to focus the image with respect to the imaging face by focal point adjustment;
   a changing unit for changing the lens barrel from the second state to the first state when the imaging unit is activated;
   a discriminating unit which discriminates whether the state of the lens barrel is the first state or the second state; and
   a control unit which, at a time of activating the imaging unit, changes the lens barrel to the first state by the changing unit if it is discriminated that the state of the lens barrel is the second state, and which maintains the first state if it is discriminated that the state of the lens barrel is the first state.

2. The imaging device according to claim 1, wherein
   the second state is a state wherein at least one part of the optical system has been moved to the imaging unit side compared to the first state, and
   the discriminating unit comprises a first detecting unit which detects that at least one portion of the optical system is at a control basis position of the optical system in the first state, and a second detecting unit which detects that the lens barrel is in the second state.

3. The imaging device according to claim 2, wherein
   the control unit controls the changing unit such that the optical system is detected to be at the control basis position by the first detecting unit if it is discriminated that the state of the lens barrel when the imaging unit is activated is the second state.

4. The imaging device according to claim 2, wherein
   the control unit controls the changing unit so that detection of the control basis position by the first detecting unit does not occur if it is discriminated that the state of the lens barrel when the imaging unit is activated is the first state.

5. The imaging device according to claim 1, further provided with
   a setting unit which can set whether or not the lens barrel is changed from the first state to the second state by the changing unit when the activation of the imaging unit is cancelled.

6. The imaging device according to claim 5, wherein the lens barrel is separable from the imaging device,
   and further comprising a second changing unit which changes the lens barrel to the second state when separated from the imaging device, if it is set by the setting unit to not change to the second state.

7. The imaging device according to claim 1 wherein
   the lens barrel is mountable and dismountable from the imaging device, and
   the control unit stops the changing of the state of the lens barrel by the changing unit until the lens barrel is completely mounted on the imaging device.

8. The imaging device according to claim 1, further comprising:
   a first mode where imaging by the imaging unit is possible, and a second mode where imaging by the imaging unit is not possible, and
   the control unit stops the changing of the state of the lens barrel by the changing unit when in the second mode.

9. A lens barrel comprising:
   an optical system with an adjustable focal point;
   a moving member which, by moving at least one part of the optical system, can change a state of the barrel between a first state where it is possible to focus with respect to an imaging face by focal point adjustment of the optical system, and a second state in which a length of the lens barrel along an optical axis of the optical system is shorter than in the first state and where is it not possible to focus an image with respect to the imaging face by focal point adjustment; and
   a discriminating unit which discriminates whether the state of the lens barrel is the first state or the second state.

* * * * *